(12) United States Patent
Zimmer

(10) Patent No.: US 6,568,022 B1
(45) Date of Patent: May 27, 2003

(54) WINDSCREEN-WIPER DRIVE

(75) Inventor: Joachim Zimmer, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/979,405

(22) PCT Filed: Mar. 10, 2001

(86) PCT No.: PCT/DE01/00918

§ 371 (c)(1),
(2), (4) Date: Feb. 25, 2002

(87) PCT Pub. No.: WO01/68424

PCT Pub. Date: Sep. 20, 2001

(30) Foreign Application Priority Data

Mar. 17, 2000 (DE) .......................... 100 13 190

(51) Int. Cl.$^7$ ................ B60S 1/16; B60S 1/24
(52) U.S. Cl. ................... 15/250.21; 15/250.31
(58) Field of Search ................ 15/250.21, 250.23, 15/250.3, 250.31, 250.351

(56) References Cited

U.S. PATENT DOCUMENTS 4,720,885 A * 1/1988 Leroy et al. ............. 15/250.21
5,884,357 A * 3/1999 Schill et al. ............. 15/250.21

FOREIGN PATENT DOCUMENTS

| DE | 196 24 297 A | 1/1998 |
| DE | 196 34 718 C | 4/1998 |
| EP | 0 182 123 A | 5/1986 |
| FR | 2 725 414 A | 4/1996 |

* cited by examiner

Primary Examiner—Gary K. Graham
(74) Attorney, Agent, or Firm—Michael J. Striker

(57) ABSTRACT

A windshield wiper drive mechanism, having a drive mechanism, a drive lever (16) whose first end is connected to the drive mechanism so that it can be pivoted about a drive axis (A), a coupling lever (28) whose first end is connected to the second end of the drive lever by a coupling joint (18) with a defined rotational axis (K) and whose second end is connected to a windshield wiper blade (12), and a power takeoff lever (30), which is connected to the coupling lever, is to be improved such that the positioning angle of the windshield wiper blade relative to the window at the turning points is to be controlled. To that end, it is provided that the rotational axis (K) of the coupling joint and the drive axis (A) of the drive lever are not parallel to one another.

10 Claims, 4 Drawing Sheets

WINDSCREEN-WIPER DRIVE

BACKGROUND OF THE INVENTION

The invention relates to a windshield wiper drive mechanism, having a drive mechanism, a drive lever whose first end is connected to the drive mechanism so that it can be pivoted about a drive axis, a coupling lever whose first end is connected to the second end of the drive lever by a coupling joint with a defined rotational axis and whose second end is connected to a windshield wiper blade, and a power takeoff lever, which is connected to the coupling lever.

The drive lever, coupling lever and power takeoff lever form a four-bar mechanism, whose function is to generate a reciprocating motion to create a larger field swept by the wipers. Another function of such a four-bar mechanism can be to vary the positioning angle of the windshield wiper blade relative to the window to be cleaned in a purposeful way.

On the assumption that all the rotational axes of the four-bar mechanism are parallel to one another and moreover the windshield wiper blade is resting on a flat window that is perpendicular to the rotational axes, the resultant orientation of the plane of longitudinal symmetry of the windshield wiper blade is always perpendicular to the plane of the window. The result can be that at the turning points of the windshield wiper blade, that is, at the transition from one direction of motion to the other at the two extreme positions, the windshield wiper blade will rattle against the window, since the wiper lip of the unpositioned windshield wiper blade has to fold over out of one bent-away position to the other. This problem can become more crucial if production variations and so forth result in incorrect positions of the windshield wiper blade. In principle, the wiper lip of the windshield wiper blade folds over more easily and with less noise, the more forcefully the windshield wiper blade is positioned against the window on reaching the terminal position corresponding to the new direction of motion. To achieve this kind of advantageous positioning angle, which is also called a normal-line error, it is known to orient the rotational axes of the four-bar mechanism obliquely to the window to be cleaned. In this way, at the respective turning points of the windshield wiper blade, a small positioning angle can be achieved. A greater obliquity of the drive axis is not possible, however, because otherwise a collision would occur between the drive lever or coupling lever, on the one hand, and the vehicle window or hood, on the other.

The object of the invention is thus to refine a windshield wiper drive mechanism of the type defined at the outset such that in a purposeful way, larger positioning angles of the windshield wiper blade relative to the window in the region of the two turning points are possible.

SUMMARY OF THE INVENTION

The windshield wiper drive mechanism of the invention has the advantage that with little installation space and purely mechanically, a purposeful variation of the positioning angle of the windshield wiper blade at the respective turning points is possible. The oblique position transmitted to the coupling arm and thus to the windshield blade is obtained solely on the basis of the oblique position of the rotational axis of the coupling joint relative to the drive axis of the drive lever. The drive lever furthermore executes a pivoting motion in a single plane, thus preventing a collision with the window of the vehicle or with the hood. By means of the orientation of the rotational axis of the coupling joint in space relative to a hypothetical neutral position, which is parallel to the drive axis, the size of the positioning angle of the windshield wiper blade and the position of the windshield wiper drive mechanism at which the drive angle is maximal can be adjusted.

BRIEF DESCRIPTION OF THE DRAWINGS

The invention will be described below in terms of a preferred embodiment shown in the accompanying drawings. Shown are.

PREFERRED EMBODIMENTS

Figure 1:
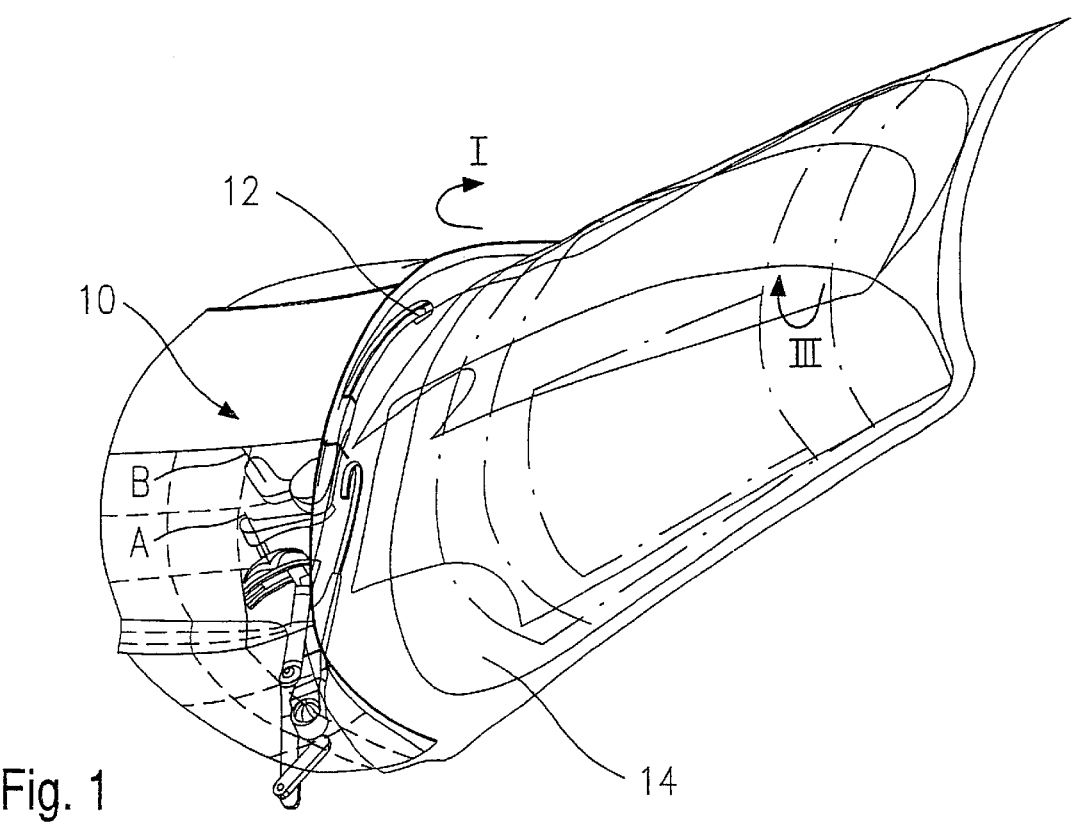
FIG. 1, a perspective elevation view of a windshield wiper drive mechanism built into a vehicle.
Figure 2:
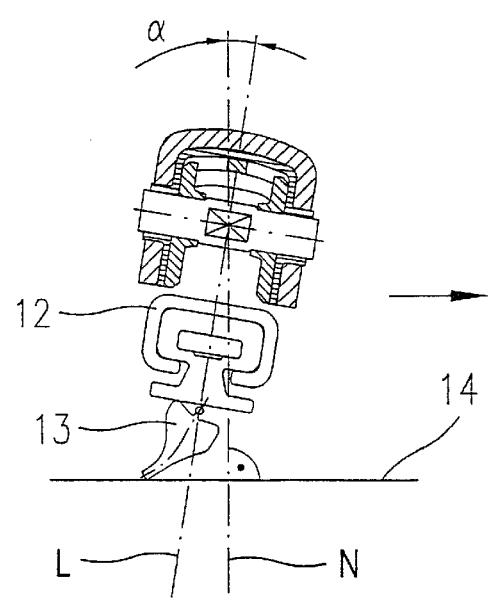
FIG. 2, in a cross section, a windshield wiper blade resting on a window.

FIG. 1, a windshield wiper drive mechanism 10 can be seen, which serves to adjust a windshield wiper blade 12 on a window 14. The windshield wiper blade 12 is meant to have various positioning angles relative to the window at the applicable points as a function of its position on the window. This can be seen in FIG. 2, which shows an angle a that is located between a plane of longitudinal symmetry L and a vertical N to the surface of the window 14. The greater the positioning angle $\alpha$, or normal-line error, the more easily does a wiper lip 13, embodied as tiltable on the windshield wiper blade, fold out of its one position to the other. This tipping over takes place at the so-called turning points of the windshield wiper blade, that is, the respective extreme positions on one edge and the other of the window to be cleaned. The positioning angle should be adjusted such that the windshield wiper blade is tilted forward in the new direction of motion. FIG. 2 thus shows the positioning of the windshield wiper blade just before it reaches the turning point and after the wiper lip 13 folds over into the new position for a motion in the direction of the arrow.

The positioning angle is attained by means of the windshield wiper drive mechanism shown in detail in FIGS. 3–6.

Figure 11:
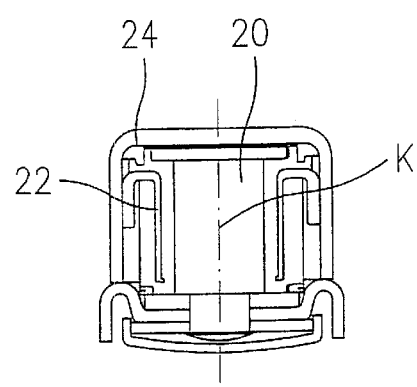
FIG. 11, in a cross-sectional view, the joint between the drive lever and the coupling lever.

This windshield wiper drive mechanism has a drive lever 16, which here is embodied as generally elongated. It has a first end, which can be connected to a windshield wiper motor (not shown), so that it can execute an oscillating motion about a drive axis A. On the second end of the drive lever 16, a coupling joint 18 is provided, which has a defined rotational axis K. The coupling joint is formed here by the connection of a bearing journal 20 to a bearing bush 22 (see also FIG. 11).

The rotational axis K of the coupling joint is inclined by an angle β relative to a hypothetical axis P, which is parallel to the drive axis A of the drive lever. The rotational axis K is oriented in space relative to the drive axis A such that the portion of the rotational axis K located above the drive lever 16, in terms of FIGS. 4 and 6, has a greater distance from the drive axis A than the portion located below the drive lever. In other words, the rotational axis K of the coupling joint, viewed in a plane that is defined by the drive axis A and the center point of the coupling joint, has a lesser spacing from the drive axis A on the side of the drive lever 16 toward which the windshield wiper blade 12 is oriented, than on the opposite side. As a reference point for the size of the angle β, values of 3° to 10° can be used.

The coupling joint 18 is embodied on a coupling joint piece 24, which is connected to a coupling lever 28 via a pivot joint 26, represented symbolically here by its center axis. For the sake of simplicity, the coupling joint piece 24 will be considered to be part of the coupling lever 28. To avoid relatively major tilting moments from being exerted on the coupling joint 18, the spacing between the rotational axis K of the coupling joint and the pivot joint 26 of the coupling lever should be as slight as possible.

The coupling lever 28 is connected to a power takeoff lever 30 by a ball joint 32. The ball joint 32 comprises a ball socket 34, which is embodied in the coupling lever 28, and a joint ball 36, which is mounted on one end of the power takeoff lever 30.

Figure 3:
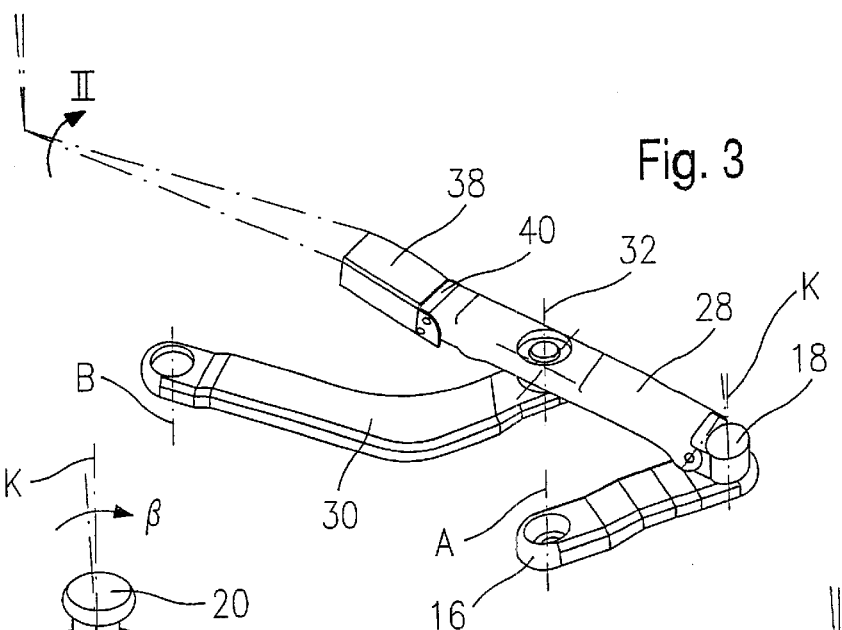
FIG. 3, in a perspective elevation view, a windshield wiper drive mechanism of the invention in a first position.
Figure 4:
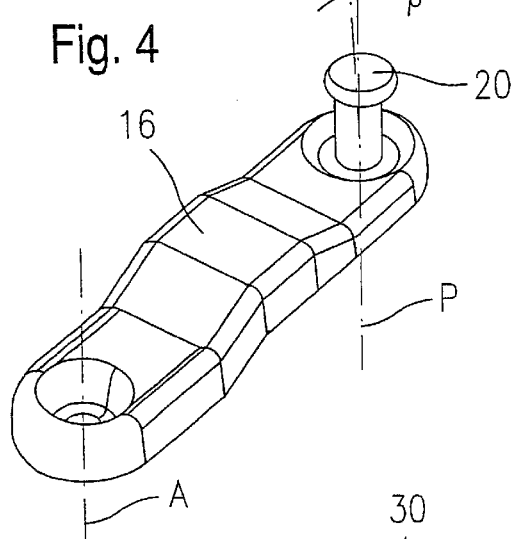
FIG. 4, in an enlarged view, the drive lever used in the windshield wiper drive mechanism of FIG. 3.

The coupling lever 28 is adjoined by a windshield wiper arm 38, merely suggested in FIG. 3, that leads to the windshield wiper blade 12. Between the coupling lever 28 and the windshield wiper arm 38, a conventional pivot joint 40 is provided, which makes it possible to transmit the pivoting motion of the coupling lever 28 to the windshield wiper blade 12, while at the same time the windshield wiper blade can be pressed against the window 14 by means of the windshield wiper arm 38 and a spring.

The power takeoff lever 30 is connected, on its end remote from the ball joint 32, to a blind bearing shaft, which is symbolized by its rotational axis B. The rotational axis B of the blind bearing shaft is parallel to the drive axis A.

In the embodiment shown, the drive lever, coupling lever, coupling joint piece and power takeoff lever are embodied as sheet-metal bent parts. However, it is readily possible to embody individual components or a plurality of components as diecast parts, or to employ other suitable constructions.

The windshield wiper drive mechanism described functions as follows: The windshield wiper blade is moved in a manner known per se over the window, in that the drive lever 16 is imparted an oscillating pivoting motion about the drive axis A. When the windshield wiper blade, in the course of this motion, is located at the turning point shown in FIG. 1, that is, where the direction of motion reverses as indicated by the arrow I in FIG. 1, the windshield wiper blade is positioned relative to an arrangement that is perpendicular to the window in the direction of the arrow II of FIG. 3. This is the result of the angle β about which the rotational axis K of the coupling joint 18 is pivoted outward. The rotation of the coupling joint piece 24 that results from this skewed position is transmitted to the windshield wiper blade via the pivot joint 26 and the pivot joint 40; the ball joint 32 between the coupling lever 28 and the power takeoff lever 30 does not prevent this tilting motion.

Figure 5:
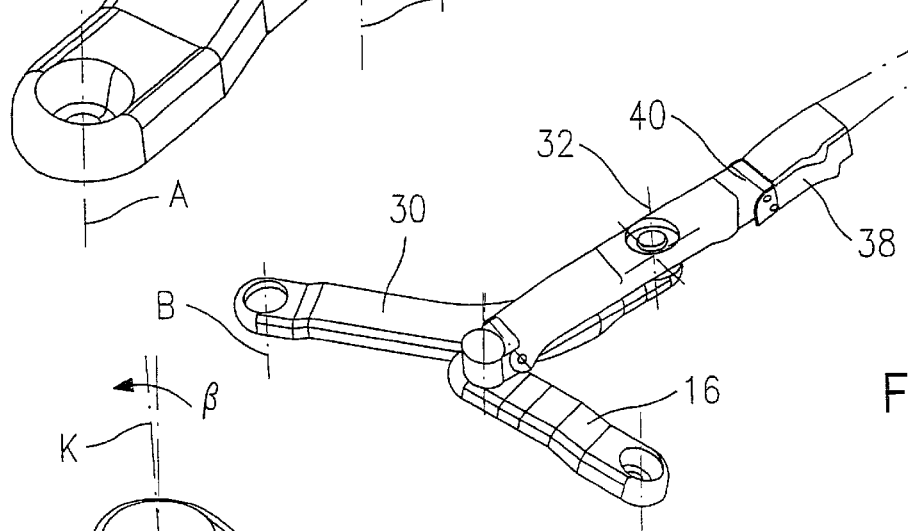
FIG. 5, in a perspective elevation view, a windshield wiper drive mechanism of the invention in a second position.
Figure 6:
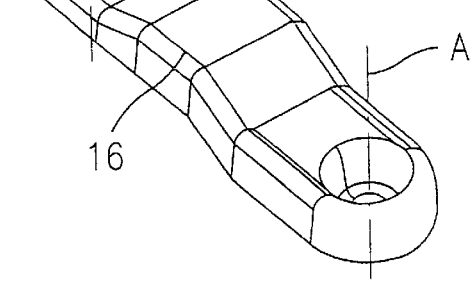
FIG. 6, in an enlarged view, the drive lever used in the windshield wiper drive mechanism of FIG. 5.
Figure 7:
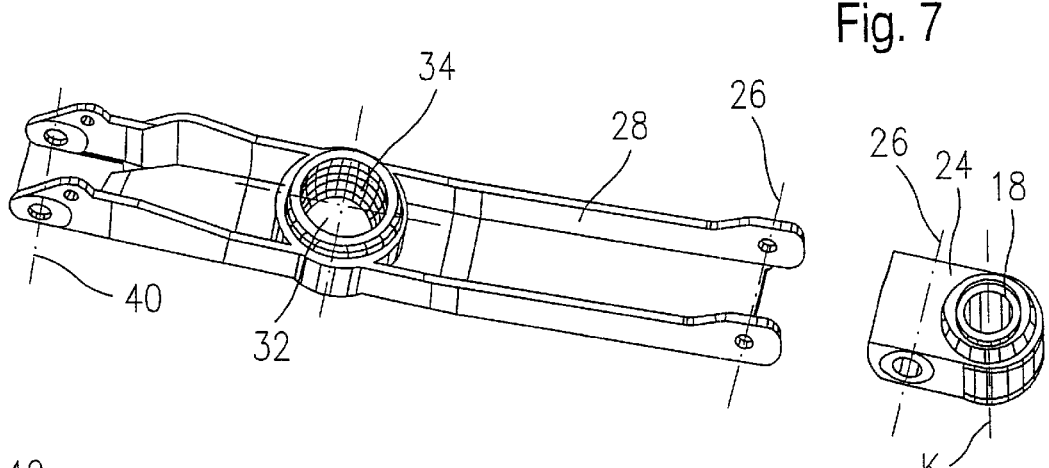
FIG. 7, in a perspective view from below, the coupling lever that is used in the windshield wiper drive mechanism of FIG. 3.
Figure 8:
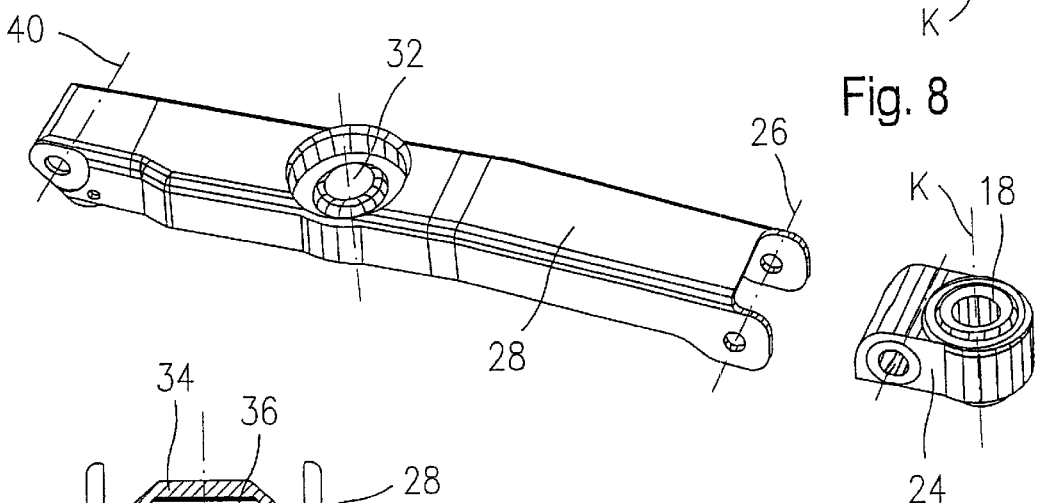
FIG. 8, in a perspective view from above, the coupling lever of FIG. 7.
Figure 10:
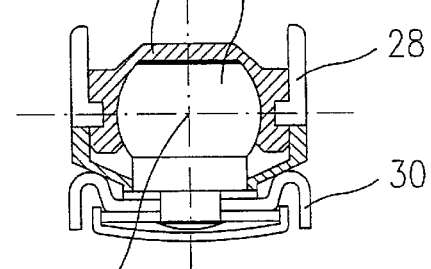
FIG. 10, in a cross-sectional view, the joint between the coupling lever and the power takeoff lever.
Figure 9:
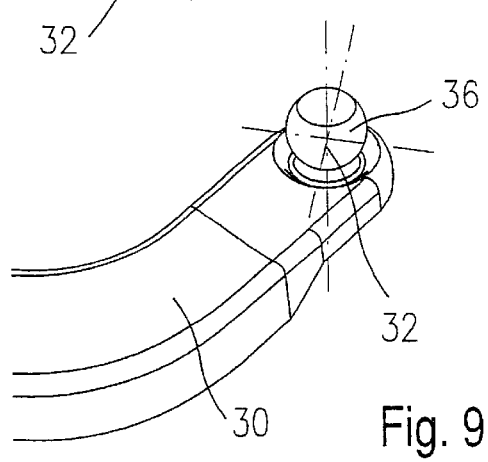
FIG. 9, in a fragmentary perspective view, the power takeoff lever of the windshield wiper drive mechanism shown in FIG. 3.

When the windshield wiper blade is at the opposite turning point, that is, is executing the reversal of the direction of motion indicated in FIG. 1 by the arrow III, the windshield wiper drive mechanism is in the position shown in FIG. 5. In this position as well, the angle β about which the rotational axis K of the coupling joint is tilted outward has the effect that the windshield wiper blade is positioned in the direction of the arrow IV of FIG. 5, as compared to a perpendicular orientation.

Figure 12:
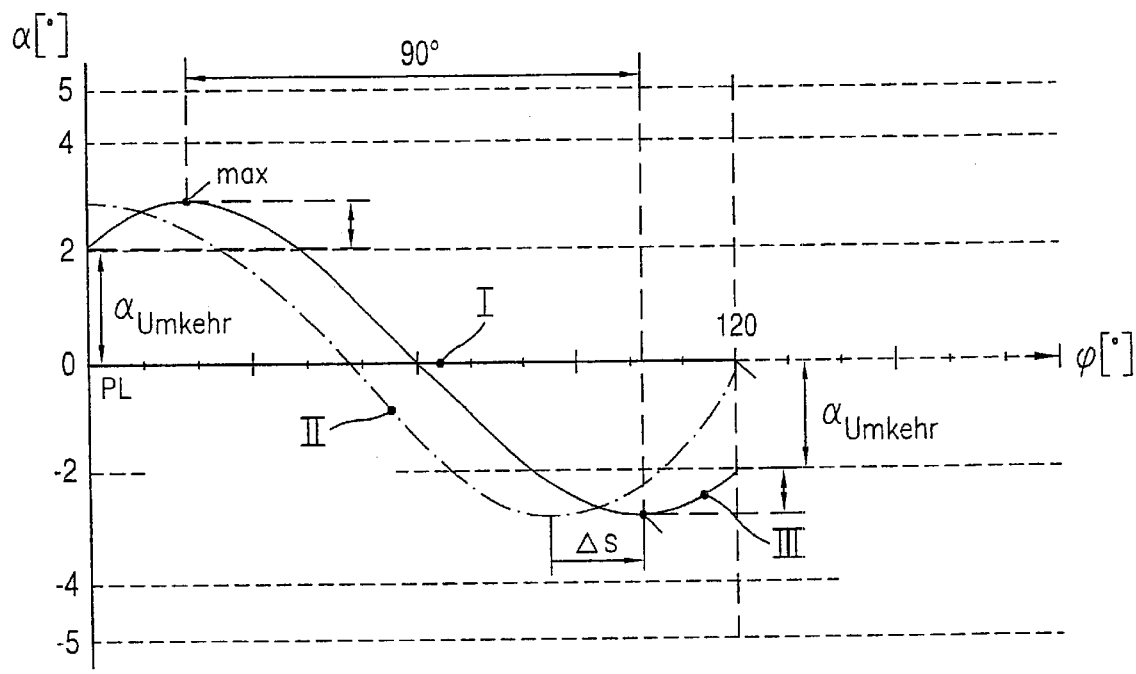
FIG. 12, a graph showing the course of the positioning angle of a windshield wiper blade relative to the window, for a flat window.

In FIG. 12, the course of the positioning angle α of the windshield wiper blade is shown, upon a rotation of the drive lever 16 about a drive angle φ about the drive axis A for the case where the window is flat. I indicates the course of the positioning angle for a windshield wiper drive mechanism in which the drive axis of the drive lever is perpendicular to the plane of the window. It follows from this that the positioning angle of the windshield wiper blade does not change in the course of the pivoting motion of the drive lever. II indicates the course of the positioning angle for a windshield wiper drive mechanism according to the invention, in which the positioning angle is at a maximum in the parked position of the windshield wiper blade, that is, the position shown in FIG. 1. Because of geometric ratios which will be addressed in detail hereinafter, the positioning angle is then approximately zero in the opposite turning point, which is equivalent to a pivoting of the drive lever by approximately 120°. Roman numeral III indicates the course of a curve for the windshield wiper drive mechanism of the invention that is displaced by a distance Δs compared to the curve II. This distance is selected such that the same positioning angle $α_{Umkehr}$ results at both turning points of the windshield wiper blade. If the curve were not shifted, the result would indeed be a larger positioning angle in one of the two turning points, but in the other turning point a positioning angle of about 0° would be the result, since the two maximum values of the positioning angle, for geometric reasons, are always apart by a drive angle of 90°.

Figure 13:
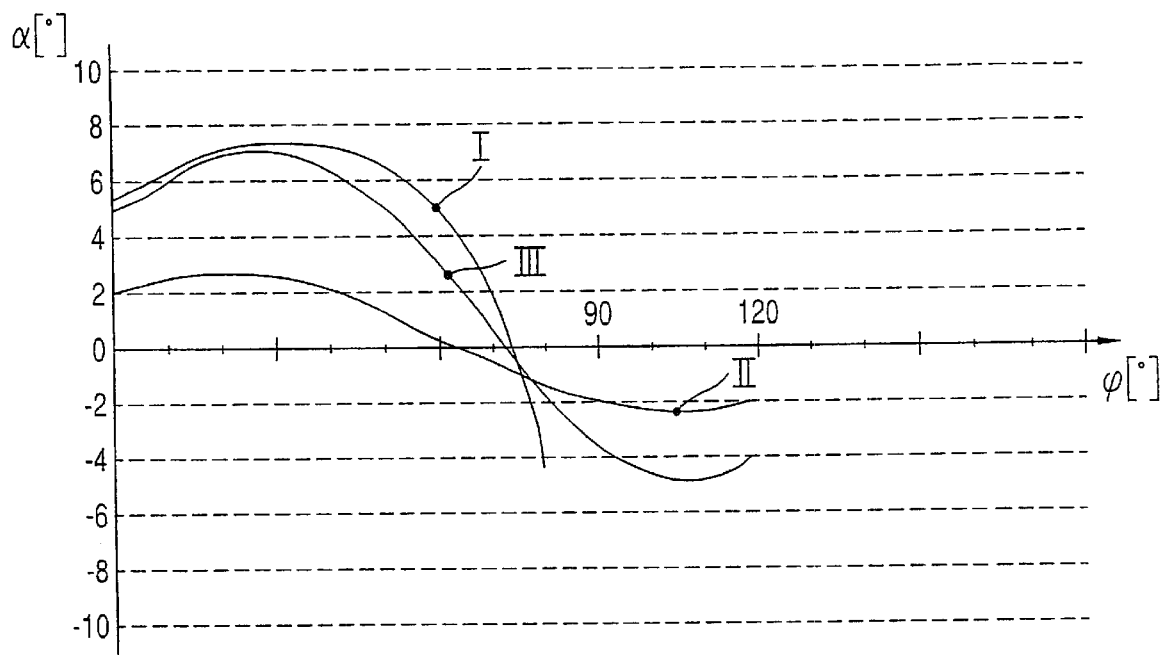
FIG. 13, a graph showing the course of the positioning angle for a three-dimensionally curved window.

In FIG. 13, the same curves are plotted for when the windshield wiper is moving over a three-dimensionally curved window, which is what actually happens in practice. As can be seen, with the windshield wiper drive mechanism of the invention, an optimized course of the positioning angle is obtained, at which the maximum resultant positioning angles are both adequately large in terms of amount and are usefully oriented relative to the drive angle φ.

As can be seen from a comparison of FIGS. 3 and 5, in order to move the windshield wiper blade from one turning point to the other, the drive lever 16 executes a pivoting motion by an angle of somewhat more than 90°. Depending on the construction, drive angles on the order of magnitude of 100 to 130° result. In each of the two extreme positions, the coupling lever 28 extends approximately perpendicular to the drive lever 16. If it is assumed that at each of the two turning points an angle of precisely 90° is established between the coupling lever and the drive lever, then the greatest positioning angles at the turning points would result if the area enclosed between the rotational axis K of the coupling joint and the hypothetical axis P that is parallel to the drive axis A extended in the plane that is defined by the drive axis and the hypothetical axis P. In other words, in the extension of the longitudinal direction of the drive lever, the rotational axis K is pivoted outward, rather than obliquely to this longitudinal axis, for instance. Conversely, if it is taken into account that in practice the angle between the coupling lever and the drive lever, at both turning points, or in other words at the instant when the size of the positioning angle is of particular interest, is not equal to 90°, then the direction in which the rotational axis K is pivoted relative to the hypothetical axis P can also deviate from the extension of the longitudinal direction of the drive lever. What must be taken into account is the fact that a change in the orientation of the rotational axis K of the coupling joint in space has an effect on the positioning angles of the windshield wiper blade at both turning points, and thus a compromise has to be found.

Instead of the embodiment of the various joints as described, other types of joints are also conceivable. What is important is only that the coupling joint 18 must be capable of bringing about the pivoting motion of the coupling lever 28 about its longitudinal axis and of permitting an angular compensation between the drive lever 16 and the coupling lever 28. Instead of the connection described between the drive lever and the coupling lever, in the form of two pivot joints connected in series, a cardan joint could also be used. Instead of the ball joint described between the coupling lever and the power takeoff lever, a cardan joint could be used. It would also be possible to replace the cardan joint with a succession of two pivot joints perpendicular to one another.

What is claimed is:

1. A windshield wiper drive mechanism, having a drive lever (16) whose first end is connectable to a drive so that it can be pivoted about a drive axis (A), a coupling lever (28) whose first end is connected to a second end of the drive lever by a coupling joint (18) with a rotational axis (K) extending through said lever and whose second end is connected to a windshield wiper blade (12), and a power takeoff lever (30), which is connected to the coupling lever, characterized in that the rotational axis (K) of the coupling joint and the drive axis (A) of the drive lever are not parallel to one another.

2. The windshield wiper drive mechanism of claim 1, characterized in that the rotational axis (K) of the coupling joint, viewed in a plane that is defined by the drive axis (A) and a center point of the coupling joint, has a lesser spacing from the drive axis (A) on a side of the drive lever (16) toward which the windshield wiper blade (12) is pointed than on an opposite side.

3. The windshield wiper drive mechanism of claim 2, characterized in that the rotational axis (K) of the coupling joint is located in said plane.

4. The windshield wiper drive mechanism of claim 2, characterized in that the rotational axis (K) of the coupling joint is inclined by an angle of 3° to 10° relative to a hypothetical axis, which is located in said plane and extends parallel to the drive axis (A).

5. The windshield wiper drive mechanism of claim 1, characterized in that the coupling joint is a pivot joint (18), which is connected to the coupling lever (28) by a further pivot joint (26), whose pivot axis extends perpendicular to the pivot axis of the first pivot joint.

6. The windshield wiper drive mechanism of claim 1, characterized in that the coupling joint is a cardan joint.

7. The windshield wiper drive mechanism of claim 1, characterized in that the coupling lever (28) is connected to the power takeoff lever (30) by a cardan joint.

8. The windshield wiper drive mechanism of claim 1, characterized in that the coupling lever (28) is connected to power takeoff lever (30) by a ball joint (32).

9. The windshield wiper drive mechanism of claim 1, characterized in that the coupling lever (28) is connected to power takeoff lever by two pivot joints.

10. The windshield wiper drive mechanism of claim 1, characterized in that the power takeoff lever (30) is connected to a blind bearing shaft (B), which extends parallel to the drive axis (A).

* * * * *